Sept. 9, 1952 J. A. GRIMM 2,609,564
MACHINE FOR CUTTING MOCK CHICKEN LEGS
Filed May 20, 1949
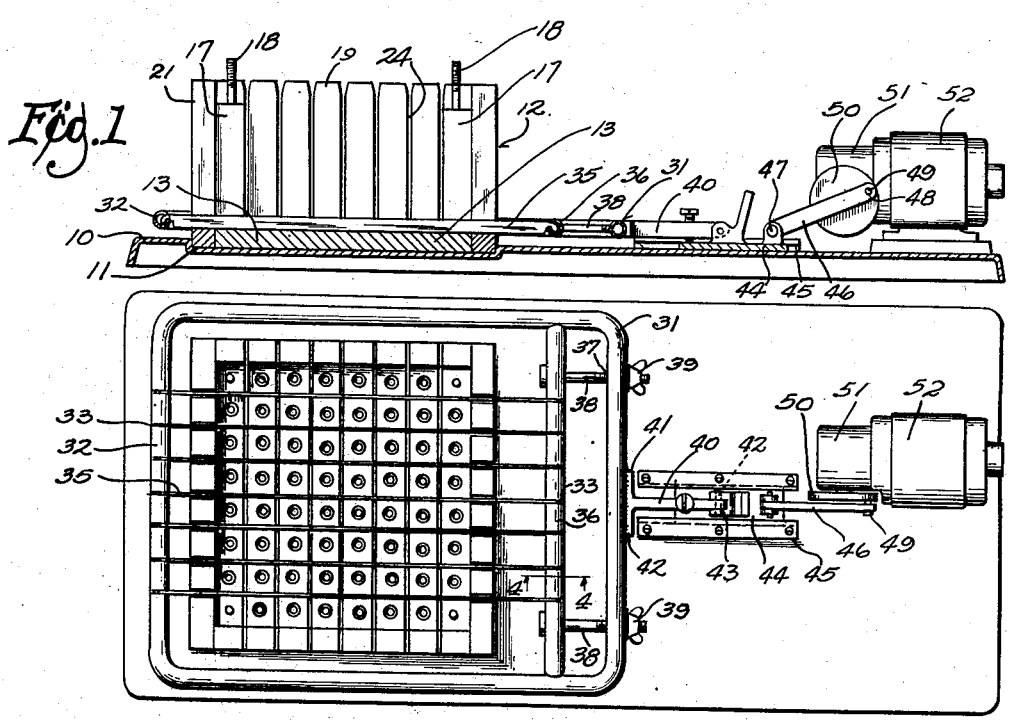
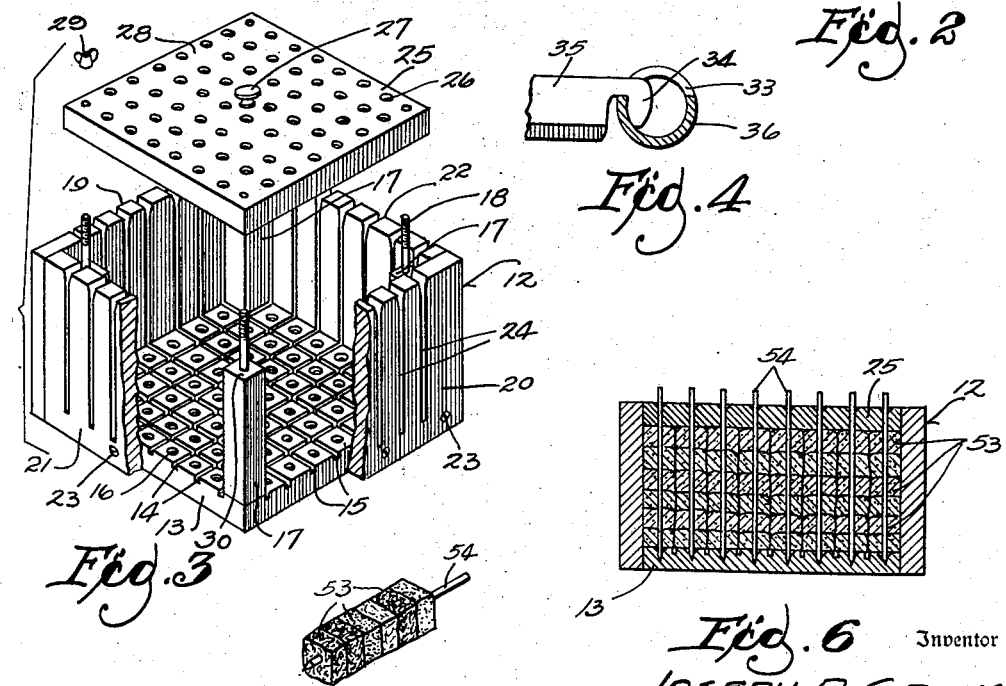
Inventor
JOSEPH A. GRIMM
By Gerald P. Welch
Attorney Patented Sept. 9, 1952

2,609,564

UNITED STATES PATENT OFFICE 2,609,564

MACHINE FOR CUTTING MOCK CHICKEN LEGS

Joseph A. Grimm, Milwaukee, Wis.

Application May 20, 1949, Serial No. 94,315

1 Claim. (Cl. 17—1)

This invention relates to improvements in meat cutting devices, and more particularly to a novel meat cutting device adapted for the cutting of products known to the trade as mock chicken legs.

An object of the invention is to provide a device of the type which will cut a plurality of mock chicken legs efficiently and uniformly.

Another object of the invention is to provide a relatively quick means for preparing and cutting a large number of products.

Other and further objects of the invention will appear as the description proceeds, reference being had to the accompanying drawing, in which:

Fig. 1 is a side view partly in elevation and partly in vertical section of the device.

Fig. 2 is a plan view of the same.

Fig. 3 is an exploded view partly broken away of a part of the structure.

Fig. 4 is an enlarged fragmentary view of one of the knives and knife retainers.

Fig. 5 is an enlarged view of a completed mock chicken leg.

Fig. 6 is a vertical sectional view taken through the slotted box with the layers of meat and skewers in place.

Referring more particularly to the drawing, the numeral 10 refers to a table plate having a square depression 11 to accommodate the slotted box 12 having a bottom 13 having the uniformly spaced grooves 14 crossed at right angles by similar grooves 15, and the shallow, countersunk bores 16. At each corner of the bottom 13 is a spacer post 17, square in cross-section and having a threaded bolt 18 projecting upwardly therefrom. Side walls 19 and 20, and end walls 21 and 22 are affixed edgedly to the bottom 13 by threaded means 23 and are provided with the uniformly spaced vertical slots 24 registering with the grooves 14 and 15 and conforming in depth therewith. A removable top plate 25 is provided with a plurality of countersunk apertures as at 26 aligned with the countersunk apertures or bores as at 16 of the bottom 13. The top plate 25 is adapted to rest on the corner spacer posts 17, which latter are shorter than the side and end walls to the extent of the thickness of said plate. A handle member 27 is disposed centrally of the top surface 28 of the plate 25. A plurality of wing nuts 29 engage the bolts 18 to secure the top plate 25 in place against the upper surfaces 30 of the spacer posts 17.

A rectangular frame 31 has the tubular end segment 32, horizontally slotted in the upper side thereof as at 33 to receive the hooked ends 34 of the blades 35. A spacer tube 36 is similarly slotted as at 33 to receive hooked ends 34 at the opposite ends of the blades 35. The frame 31 is bored at 37 to accommodate the two bolts 38, and the wing nuts 39 engage said bolts to permit tightening the blades 35 in place in the frame 31. An arm 40 has an integral cross portion 41 welded to the frame 31 at 42 thereof. The opposite end of arm 40 is bored at 42 to accommodate the pin 43 in the cross-head 44 adapted for reciprocal movement in the slide 45. A connecting rod 46 has the pivot connection at 47 with the cross-head 44 and is apertured at 48 to pivotally engage the pin 49 on the crank wheel 50 in turn connected with the reduction gear 51 and the electric motor 52.

In use, a plurality of layers of meat 53 are placed in the slotted box 12. The meat may usually slightly more than fill said box 12. The top plate 25 is then tightened into place by means of the wing nuts 29 to compress said layers. A plurality of shewer sticks 54 are then inserted downwardly through the countersunk apertures at 26, through the meat layers 53 and into the countersunk bores at 16 of the bottom 13. The blades 35 having been secured in place by drawing up the wing nuts 39, the motor 52 is started to reciprocate the blades as they are manually started in the upper ends of the grooves or slots 24 after the top plate 25 has been removed. The downward movement of the blades 35 is limited by one set of the grooves disposed horizontally in the bottom 13. The box 12 is then lifted and turned horizontally ninety degrees and replaced in the recess at 11 of the table plate 10. The cutting operation is then repeated whereupon the entire contents of the box 12 will be made up of a plurality of mock chicken legs, one of which is shown in Fig. 5.

It will be understood that the device is capable of many modifications in structure and design, without departing from the spirit of the invention, within the scope of the appended claim.

Having thus described the invention, what is claimed and desired to be secured by Letters Patent of the United States, is:

A device of the character described including a flat base having a shallow square recess in the top surface thereof, a square box adapted to nest freely in said recess, vertical end and side walls in said box having a plurality of spaced and oppositely aligned vertical slots, a bottom in said box having a plurality of grooves in its upper surface extending from end to end of said box and a second plurality of grooves intersecting at right angles said first mentioned grooves all of said grooves communicating with said side and end wall slots, vertical corner posts within said walls shorter than the upper edges of said walls, bolts extending upwardly from the tops of said posts, threaded means on said bolts, a square flat plate apertured to receive said bolts and freely movable within the said walls above said posts for compressing a plurality of horizontal layers of meat to be held in said box by manipulation of said threaded means, said box bottom and said plate when in place having pluralities of spaced vertically aligned bores adapted to freely pass skewers to be forced through the compressed meat held therebetween.

JOSEPH A. GRIMM

REFERENCES CITED

The following references are of record in the file of this patent:

UNITED STATES PATENTS

| Number | Name | Date |
|---|---|---|
| 179,934 | Mervin | July 18, 1876 |
| 695,501 | Smith | Mar. 18, 1902 |
| 1,002,431 | Noack | Sept. 5, 1911 |
| 1,405,671 | Crozier | Feb. 7, 1922 |
| 1,462,717 | Maus | July 24, 1923 |
| 2,036,403 | Friesel et al. | Apr. 7, 1936 |
| 2,210,765 | Mahlke | Aug. 6, 1940 |
| 2,290,169 | Debus | July 21, 1942 |

FOREIGN PATENTS

| Number | Country | Date |
|---|---|---|
| 231,305 | Germany | Feb. 20, 1911 |